UNITED STATES PATENT OFFICE.

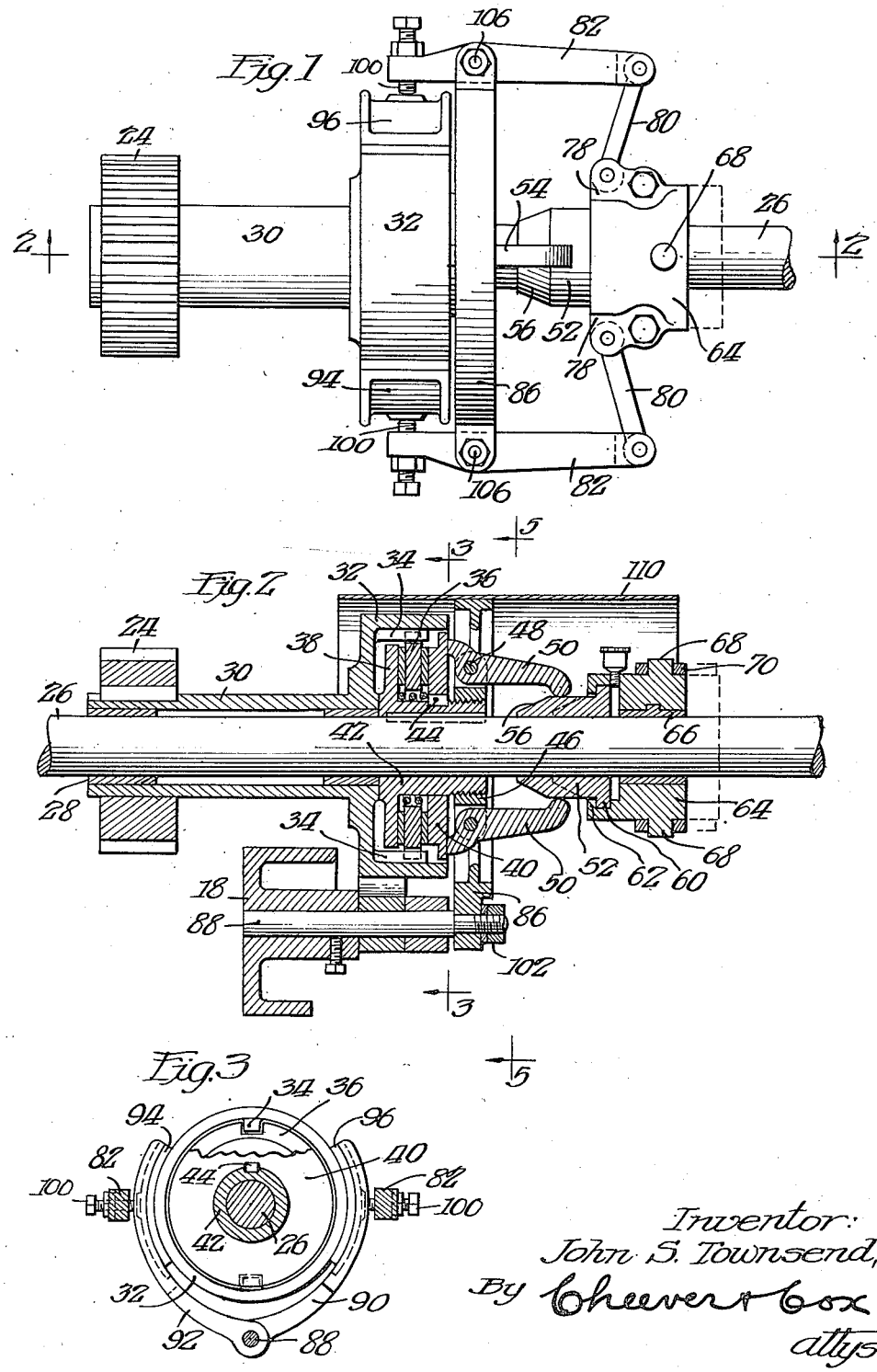

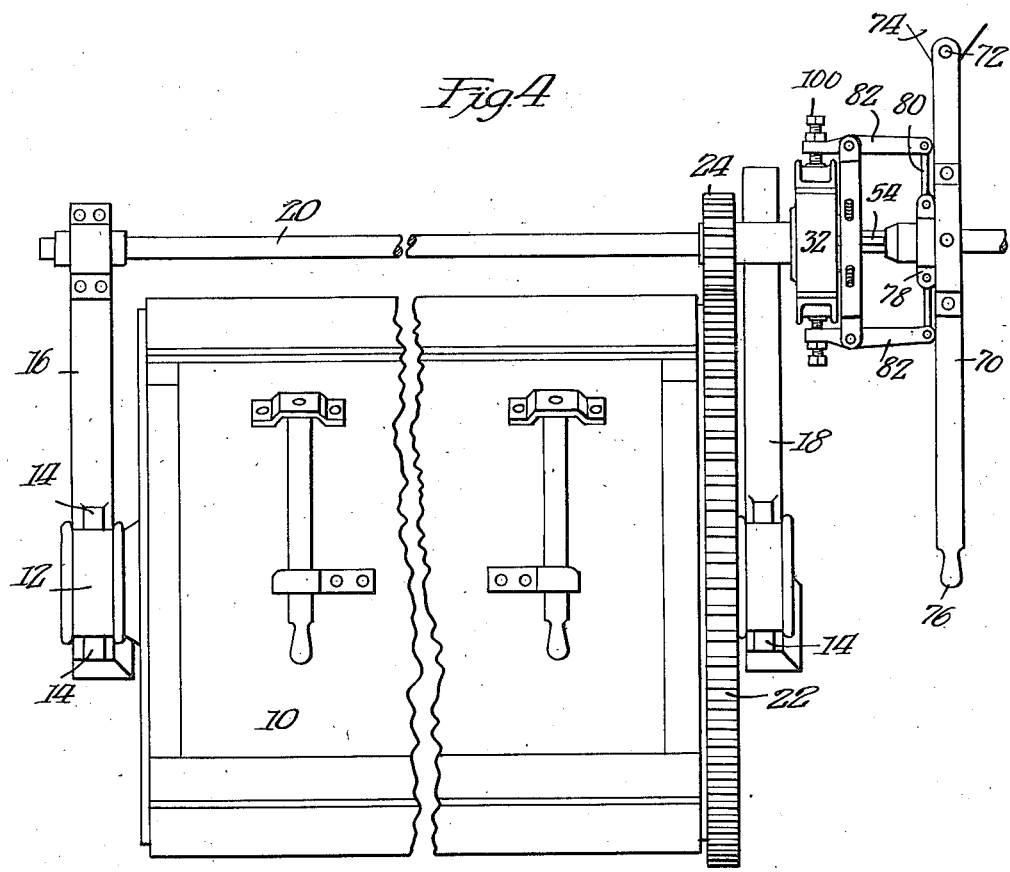
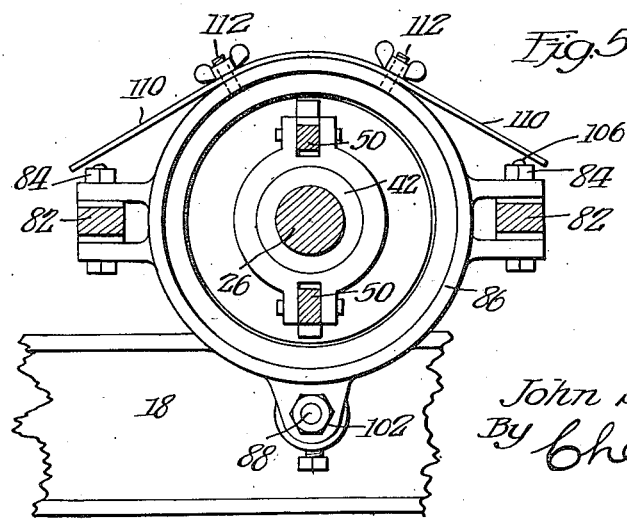

JOHN S. TOWNSEND, OF HARVEY, ILLINOIS, ASSIGNOR TO WHITING CORPORATION, OF HARVEY, ILLINOIS, A CORPORATION OF ILLINOIS.

COMBINED CLUTCH AND BRAKE.

1,418,747. Specification of Letters Patent. Patented June 6, 1922.

Application filed May 7, 1921. Serial No. 467,567.

*To all whom it may concern:*

Be it known that I, JOHN S. TOWNSEND, a citizen of the United States, residing at Harvey, in the county of Cook and State of Illinois, have invented a certain new and useful Improvement in Combined Clutches and Brakes, of which the following is a specification.

This invention relates to combined clutch and brake mechanism by which a single movement of a control member, usually a lever, shifts the parts from a position where the clutch is in operation and the brake is free to the opposite position where the brake is in action and the clutch is released, or vice versa. The invention is of general application, but it is for the convenience of illustration here shown as applied to a tumbling or rattle barrel.

The object of the invention is to provide novel mechanism of this class having a plurality of brake shoes in which the shoes automatically adjust themselves to the wheel or other rotating objects so that each shoe applies uniform pressure—this without disturbing the action of the clutch or any of the other parts of the device. The invention consists in means for attaining the foregoing objects which can be easily and cheaply made, which is satisfactory in use and not readily liable to get out of order. More particularly, the invention consists in many features and details of construction hereafter more fully set forth in the specification and claims.

Referring to the drawings in which like numerals designate the same parts throughout the several views.

Figure 1 is a plan view of the essential operating mechanism of this invention.

Figure 2 is a sectional side view on the line 2—2 of Figure 1.

Figure 3 is an end view on the line 3—3 of Figure 2.

Figure 4 is a plan view of a rattle barrel mechanism having the device of this invention in its preferred form applied thereto.

Figure 5 is an end view on the line 5—5 of Figure 2.

In Figure 4 a rattle barrel 10 of conventional form is shown provided with end trunnions 12 which roll in bearing supports 14 formed on standards 16 and 18 which rest on the floor of the shop or other locations where the device is to be used. These standards are tied together by one or more conventional tie rods 20.

The barrel 10 is provided with a conventional gear wheel 22 meshing with the pinion 24 mounted concentrically with shaft 26 extending transversely of and somewhat above frame member 18, as will clearly appear from Figure 5.

Rotatable on the shaft 26 and contacting therewith on the two bushings 28 is a sleeve 30 to one end of which gear 24 is rigidly secured. The opposite end of this sleeve 30 carries rigid, and in the particular case here illustrated, integral therewith a hollow pulley or brake wheel 32. Projecting inwardly from the opposite points in the flange of this wheel are keys 34 along which the central clutch disk 36 reciprocates in such manner that rotation with reference to the pulley rim is prevented.

Inside the pulley 32 and on opposite sides of this central clutch disk 36 are side clutch disks 38 and 40, the former rigid on a hub 42, the latter slidable along the hub but non rotatable with reference thereto by reason of the presence of the key 44 carried by the hub. Screw threaded on the hub 42 is a nut 46 carrying suitably disposed pivot pins 48 located on opposite sides thereof. Pivoted on each one of these pins 48 is a lever 50 having a long and a short arm. Each short arm contacts the clutch plate 40 and is adapted to when suitably energized shove the plate 40 along the key 44 to the left as viewed in Figure 2, to thus clamp the clutch plates 36, 38, and 40 rigidly together, to in obvious manner, cause shaft 26, when energized by suitable power, not shown, drive the gear 24.

The ends of the longer arms of lever 50 approach the shaft 26 as shown and are adapted to be engaged by cone faces 56 of clutch actuating member 52, non-rotatably mounted on shaft 26 by means of a key or keys 54 projecting therefrom. This cone member 52 is movable between the full line position of Figure 2 where it forces lever arm 50 apart and thus causes the clutch to lock the shaft to the gear as described and the dotted line position of the same figure in which the conical faces 56 of the cone member are clear of said lever arms and consequently no locking action takes place. On the right hand end of conical block 52 is a radial flange 60 which is, as shown in Figure 2, overlapped by an inwardly turned flange 62 on a collar 64. This collar is reciprocatable along shaft 26 from the dotted line to the full line position Figure 2. Shaft 26 is rotatable inside this collar inside the bushing 66. Projecting from opposite sides of this collar 64 are studs 68 on which are pivoted opposite side portions of the looped lever member 70, pivoted at one end 72 on a suitable support 74 and having at its opposite end a suitable handle 76 for convenient manual operation.

Extending from opposite sides of the collar 64 and as shown at 90 degrees from the studs 68 are lugs 78, each of which has a short rod 80 in turn connected at its outer end to the longer arm of a lever 82. Each lever 82 is pivoted between its ends on a bolt 84 carried by a member, which is in some way divided so as to pass on opposite sides of the shaft, in the particular embodiment shown, a ring 86. This ring is in turn pivoted intermediate between said levers 82 on a rod or stud 88 projecting from a suitable support such as the adjacent standard 18 of the rattle barrel 10.

Also pivoted on this rod 88 intermediate between divided member or ring 86 and support 18 are two oppositely disposed and directed curved lever arms 90 and 92 which terminate at their respective upward ends in the brake shoes 94 and 96 which bear upon opposite points on the circumference of the pulley 32. As each one of these brake shoes is engaged by an adjustable screw 100 carried by the adjacent one of lever arms 82, the operator can by adjusting a selected one of these screws, adjust the action of such a lever 82 on the brake shoe and consequently the action of that brake shoe on the pulley.

The ring 86 is connected to the stud 88 through the action of a nut 102 which is loosely mounted so that the ring 86 may always rock slightly about the stud 88 and therefore enable the levers 82 to swing about the stud 88 crosswise of the axis of shaft 26 in unison with the arms 90 and 92 and the brake shoes 94 and 96 attached to them. The result of this construction is that if as is generally the case the operator does not use extreme care in securing an exact uniform adjustment of the screws 100 on respective brake shoes, uniform action of the brake shoes under the action of lever 70 will still take place. The reason is that if one screw 100 is set in farther than the other, so that when the operator begins to move lever 76 in the obvious manner and set the brake shoes on the pulley and he thereupon initially places a greater pressure on that particular brake shoe through screw 100, the ring 86 automatically swings on stud 88 until the position of the respective levers 82 their pivot points 106 on the ring 86 and the rods 80 is such that the brake shoes apply equal pressure on opposite sides of the pulley 32.

The essential mechanism described is preferably covered by a sort of a roof structure 110 held in place by screws 112. In the complete operation of the device, the operator takes hold of handle 76 and on moving it to the left until the parts assume the position of Figures 1 and 2 throws in the clutch mechanism and loosens the brake mechanism. In this position power transmitted through shaft 26 drives gear 24 and consequently gear 22 and the barrel 10. On moving lever 70 and attached parts to the position of Figure 4 the brake shoes are obviously set upon the pulley 32 and the conical faces 56 of block 52 are moved to the dotted line position of Figure 2 so that the clutch is released and the barrel ceases to rotate.

The automatic brake adjusting mechanism described has advantages when used independently of the clutch mechanism, but it is specially advantageous in securing easy, free automatic operation of the combined brake and clutch mechanism shown and described.

Having thus described my invention, what I claim as new and desire to secure by Letters Patent, is:

1. In mechanism of the class described, a brake pulley to be controlled, a pair of brake shoes oppositely disposed on the pulley, levers supporting said brake shoes pivoted at a point at one side thereof, a lever arm support pivoted at substantially the same point as the brake shoe supporting levers, brake shoe operating levers on said lever arm support, one adjacent to each brake shoe, and means for operating the brake operating lever, for the purposes set forth.

2. In mechanism of the class described, a brake pulley to be controlled, a pair of brake shoes oppositely disposed on the pulley, levers supporting said brake shoes pivoted at a point at one side thereof, a lever arm support pivoted at substantially the same point as the brake shoe supporting levers, brake shoe operating levers on said lever arm support, one adjacent to each brake shoe, means for operating the brake operating lever, and means for adjusting each brake operating lever with reference to its adjacent operating lever, for the purposes set forth.

3. In mechanism of the class described, a shaft, a divided member passing on opposite sides of the shaft, a pivot for the divided member at the side of the shaft permitting it to rock transversely of the shaft, a brake operating block reciprocatable on the shaft, levers in the plane of the axis of the shaft pivoted on the divided member and rockable in and out from the shaft by reciprocation of the block, a brake wheel concentric with the shaft, brake shoes operated by the last mentioned levers movable to and from the brake wheel and a connection between each brake shoe and the pivot on which the divided member rocks, for the purposes set forth.

4. In mechanism of the class described, a shaft, a ring around the shaft, a pivot for the ring at the side of the shaft permitting it to rock transversely of the shaft, a brake operating block reciprocatable on the shaft, levers in the plane of the axis of the shaft pivoted on the ring and rockable in and out from the shaft by reciprocation of the block, a brake wheel concentric with the shaft, brake shoes operated by the last mentioned levers movable to and from the brake wheel and a connection between each brake shoe and the pivot on which the ring rocks, for the purposes set forth.

5. In mechanism of the class described, a shaft, a ring around the shaft, a pivot for the ring at the side of the shaft permitting it to rock transversely of the shaft, a brake operating block reciprocatable on the shaft, levers in the plane of the axis of the shaft pivoted on the ring and rockable in and out from the shaft by reciprocation of the block, a brake wheel concentric with the shaft, brake shoes operated by the last mentioned levers movable to and from the brake wheel and a connection between each brake shoe and the pivot on which the ring rocks, and a cover for the essential parts of the mechanism attached to the ring.

6. In mechanism of the class described, a shaft, a divided member passing on opposite sides of the shaft, a pivot for the divided member at the side of the shaft permitting it to rock transversely of the shaft, a brake operating block reciprocatable on the shaft, levers in the plane of the axis of the shaft pivoted on the divided member and rockable in and out from the shaft by reciprocation of the block, a brake wheel concentric with the shaft, brake shoes operated by the last mentioned levers movable to and from the brake wheel and a connection between each brake shoe and the pivot on which the divided member rocks, a clutch inside the brake wheel adapted to connect the wheel and shaft and means by which the brake operating block throws the clutch in action when the brakes are released and vice versa.

7. In mechanism of the class described, a shaft, a divided member passing on opposite sides of the shaft, a pivot for the divided member at the side of the shaft permitting it to rock transversely of the shaft, a brake operating block reciprocatable on the shaft, levers in the plane of the axis of the shaft pivoted on the divided member and rockable in and out from the shaft by reciprocation of the block, a brake wheel concentric with the shaft, brake shoes operated by the last mentioned levers movable to and from the brake wheel and a connection between each brake shoe and the pivot on which the divided member rocks, a clutch inside the brake wheel adapted to connect the wheel and shaft and means passing from the brake wheel through the divided member to the operating block, by which the brake operating block throws the clutch in action when the brakes are released and vice versa.

8. In mechanism of the class described, a shaft, a ring around the shaft, a pivot for the ring at the side of the shaft permitting it to rock transversely of the shaft, a brake operating block reciprocatable on the shaft, levers in the plane of the axis of the shaft pivoted on the ring and rockable in and out from the shaft by reciprocation of the block, a brake wheel concentric with the shaft, brake shoes operated by the last mentioned levers movable to and from the brake wheel and a connection between each brake shoe and the pivot on which the ring rocks, a clutch inside the brake wheel adapted to connect the wheel and shaft and means passing from the brake wheel through the ring to the operating block, by which the brake operating block throws the clutch in action when the brakes are released and vice versa.

In witness whereof, I have hereunto subscribed my name in the presence of two witnesses.

JOHN S. TOWNSEND.

Witnesses:
   HARRY W. BAKER,
   L. D. REED.